(12) United States Patent
Gao et al.

(10) Patent No.: US 11,139,908 B2
(45) Date of Patent: Oct. 5, 2021

(54) BEAM DOMAIN OPTICAL WIRELESS COMMUNICATION METHOD AND SYSTEM

(71) Applicant: SOUTHEAST UNIVERSITY, Jiangsu (CN)

(72) Inventors: Xiqi Gao, Jiangsu (CN); Chen Sun, Jiangsu (CN); Wenjin Wang, Jiangsu (CN); Li You, Jiangsu (CN); Anan Lu, Jiangsu (CN); Wen Zhong, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 491 days.

(21) Appl. No.: 16/302,676

(22) PCT Filed: Sep. 22, 2017

(86) PCT No.: PCT/CN2017/102827
§ 371 (c)(1),
(2) Date: Nov. 19, 2018

(87) PCT Pub. No.: WO2019/051862
PCT Pub. Date: Mar. 21, 2019

(65) Prior Publication Data
US 2021/0226721 A1    Jul. 22, 2021

(30) Foreign Application Priority Data
Sep. 15, 2017    (CN) .......................... 201710830998.1

(51) Int. Cl.
*H04L 5/00*       (2006.01)
*H04W 72/04*   (2009.01)
(Continued)

(52) U.S. Cl.
CPC ............ *H04J 14/086* (2013.01); *H04B 10/11* (2013.01); *H04B 10/50* (2013.01); *H04L 5/0005* (2013.01);
(Continued)

(58) Field of Classification Search
CPC ....... H04J 14/086; H04B 10/11; H04B 10/50; H04B 7/0617; H04B 7/0673; H04B 7/0693; H04L 5/0005; H04W 72/046
(Continued)

(56) References Cited

U.S. PATENT DOCUMENTS

| 2002/0109884 | A1 | 8/2002 | Presley et al. |
| 2003/0022694 | A1* | 1/2003 | Olsen .................. H01Q 3/2682 455/562.1 |
| 2016/0087336 | A1* | 3/2016 | Maltsev ............... H04B 7/0695 342/368 |

FOREIGN PATENT DOCUMENTS

CN    101431137    5/2009

OTHER PUBLICATIONS

Kim et al., "Wireless visible light communication technology using optical beamforming", Optical Engineering, Oct. 2013, pp. 106101-1-106101-6.
(Continued)

*Primary Examiner* — Ted M Wang
(74) *Attorney, Agent, or Firm* — JCIPRNET

(57) ABSTRACT

The invention discloses a beam domain optical wireless communication method and system. A base station is equipped with an array of optical transceiver ports or transmitter/receiver ports and a lens, each optical transceiver port forms a beam with centralized energy through the lens, and the base station generates beams in different directions by using the optical transceiver port array and the lens, thereby realizing multi-beam coverage or large-scale beam
(Continued)

coverage in a communication region. The base station transmits/receives signals of multiple or a large number of user terminals by using channel state information of each user terminal, and different optical transceiver ports transmit/receive signals in different directions, thereby realizing simultaneous communication and bidirectional communication between the base station and different user terminals.

40 Claims, 4 Drawing Sheets

(51) Int. Cl.
*H04J 14/08* (2006.01)
*H04B 10/11* (2013.01)
*H04B 10/50* (2013.01)
*H04B 7/06* (2006.01)

(52) U.S. Cl.
CPC ......... *H04W 72/046* (2013.01); *H04B 7/0617* (2013.01); *H04B 7/0673* (2013.01); *H04B 7/0695* (2013.01)

(58) Field of Classification Search
USPC .......................................................... 398/67
See application file for complete search history.

(56) References Cited

OTHER PUBLICATIONS

O'Brien et al., "Integrated Transceivers for Optical Wireless Communications", IEEE Journal of Selected Topics in Quantum Electronics, Jan. 2005, pp. 173-183.
"International Search Report (Form PCT/ISA/210)", dated May 30, 2018,, pp. 1-4.

\* cited by examiner

BEAM DOMAIN OPTICAL WIRELESS COMMUNICATION METHOD AND SYSTEM

CROSS-REFERENCE TO RELATED APPLICATION

This is a 371 application of the International PCT application serial no. PCT/CN2017/102827, filed on Sep. 22, 2017, which claims the priority benefits of China Application No. 201710830998.1, filed on Sep. 15, 2017. The entirety of each of the above-mentioned patent applications is hereby incorporated by reference herein and made a part of this specification.

TECHNICAL FIELD

The present invention belongs to the field of optical wireless communications, and particularly relates to a beam domain optical wireless communication method and system.

BACKGROUND

Optical wireless communication is a new wireless communication mode that has received extensive attention in recent years. A base station or a transmitting device loads the data to be transmitted on optical signals for transmission by using an optical transmitter unit, such as a LED (Light Emitting Diode), and a user terminal or a receiving device receives the optical signal to obtain information by using an optical receiver unit, such as a photodiode. Compared with the conventional radio frequency wireless communication, the optical wireless communication has the advantages of green and environmental protection, no electromagnetic interference, energy conservation, large light source bandwidth, simple communication network, and high security. Meanwhile, the optical wireless communication can alleviate the current problem of shortage in radio frequency wireless communication spectrum resources, and provide high-speed data transmission to meet the requirements of wireless communication on high speed, stability, safety and environmental protection in the future, and has a great development prospect.

In the current solution of the optical wireless communication system, channels of different optical transmitter units in the same optical transmitter unit array to any user terminal are highly correlated, and only one data stream can be transmitted. In order to realize simultaneous multi-user communication or simultaneous transmission of multiple data streams, the current solution is equipped with multiple optical transmitter unit arrays at different positions, and the spatial dimension is increased by using a MIMO (Multiple Input and Multiple Output) technology. However, the number of the optical transmitter unit array restricts the user number served simultaneously, which is the bottleneck for further improvement of system performance. On the other hand, the current solution often only adapts to one-directional communication, and actual application needs to have bidirectional communication and bidirectional information interaction capability.

SUMMARY

In order to solve the aforementioned technical problems in the background, the present invention provides a beam domain optical wireless communication method and system to realize simultaneous communication and bidirectional communication with a number of user terminals, thereby improving spectrum efficiency, power efficiency and system capacity.

In order to achieve the technical objects above, the technical solution of the present invention is as follows.

The present invention discloses a transmitting method of beam domain optical wireless communication, wherein a base station or a transmitting device of the beam domain optical wireless communication is equipped with an optical transmitter unit array and a lens, an optical signal transmitted by each optical transmitter unit in the optical transmitter unit array forms a beam in some direction through the lens, the optical signals transmitted by different optical transmitter units form beams in different directions through the lens, the base station or the transmitting device forms beam coverage in a communication scope thereof by using the optical transmitter unit array and the lens, different beams cover different regions, and the base station or the transmitting device simultaneously communicates with each user terminal or receiving device in the beam domain.

Further, the optical transmitter unit is a light-emitting diode or a laser diode, and different optical transmitter units are separated from each other by using a photoresist or reflective material to construct the optical transmitter unit array, and a square array or a circular array is used as the optical transmitter unit array.

Further, the base station or the transmitting device is equipped with single or multiple lenses; when the single lens is arranged, the optical transmitter unit array is arranged on the focal plane of the lens, the optical signal transmitted by each optical transmitter unit is refracted to some direction through the lens, thereby having an energy centralization feature depending on a transmitting angle, so as to form one beam; when the multiple lenses are arranged, each lens covers one or multiple optical transmitter units, the optical transmitter unit corresponding to each lens is arranged on the focal plane of the lens, the optical signal transmitted by each optical transmitter unit forms one beam through the lens, or the optical signals transmitted by the multiple optical transmitter units corresponding to one lens form one beam through the lens.

Further, the optical wireless communication is implemented in the beam domain, which comprises beam domain optical downlink transmission; the beam domain optical downlink transmission comprises that the base station or the transmitting device generates a transmitting signal by using channel state information of each user terminal or receiving device, different optical transmitter units in the same optical transmitter unit array transmit different signals, then the optical transmitter unit array transmits the signals to different user terminals or receiving devices simultaneously.

Further, in the beam domain optical downlink transmission, when the base station or the transmitting device generates the transmitting signal by using the channel state information of each user terminal or receiving device, a linear precoding beam domain transmission based on maximum ratio transmission or regularized zero forcing, or a beam division multiple access downlink transmission is used.

Further, the beam division multiple access downlink transmission comprises that the base station or the transmitting device conducts user scheduling and beam allocation according to the channel state information of each user terminal or receiving device, selects multiple user terminals or receiving devices capable of communicating by using the same time-frequency resource, allocates non-overlapping beam sets to the user terminals or the receiving devices that are communicated simultaneously, and the base station or the transmitting device transmits pilot signals and data signals to the user terminal or the receiving device on the beam allocated to each user terminal or receiving device.

According to the receiving method of beam domain optical wireless communication based on the transmitting method above, the user terminal or the receiving device receives the signal transmitting in the beam domain by the base station or the transmitting device through a transmission channel, and the user terminal or the receiving device estimates channel information according to the received pilot signal, and detect the data signal by using the channel state information.

Further, the user terminal or the receiving device is equipped with an optical receiving device, the optical receiving device is a single optical receiver unit, or is composed of the optical receiver unit array and the lens; when the optical receiving device is the single optical receiver unit, the optical receiving device receives the transmitting signal of one base station or transmitting device; and when the optical receiving device is composed of the optical receiver unit array and the lens, the optical receiving device receives the transmitting signals of single or multiple base stations or transmitting devices at different positions, and the lens refracts optical signals in different directions to different optical receiver units.

Further, the channel state information is the path gain of all the beams transmitted by the base station or the transmitting device to the user terminal or the receiving device; when a linear precoding beam domain transmission based on maximum ratio transmission or regularized zero forcing is used, the channel state information is the equivalent channel gain of each data stream in the precoding domain; and when a beam division multiple access downlink transmission is used, the channel state information comprises the channel gain from the beam or beam set allocated for each user terminal or receiving device at the base station or the transmitting device to the user terminal or the receiving device.

Further, the receiving process comprises signal detection and decoding, and recovery of original transmitting signals.

A beam domain optical wireless communication system comprises the transmitting device at the base station and the receiving device at the user side;
  at the base station side, the transmitting device comprising:
  an optical transmitter unit array module, configured to transmit optical signals of different beams in downlink transmission, wherein each optical transmitter unit independently transmits the optical signal;
  a lens module, configured to refract the optical signals transmitted by different optical transmitter units to different directions to form different beams; and
  a downlink transmitting signal generation module, configured to generate signals transmitted to different user terminal or receiving devices; and
  at the user terminal side, the optical receiving device comprising:
  an optical receiving module, configured to receive a downlink optical signal transmitted by the base station or transmitting device;
  a channel estimation module, configured to estimate channel state information according to the received pilot signal; and
  a signal detection module, configured to detect the received data signal.

Further, the optical transmitter unit is a light-emitting diode or a laser diode, and different optical transmitter units are separated from each other by using a photoresist or reflective material to construct the optical transmitter unit array module, and a square array or a circular array is used as the optical transmitter unit array module.

Further, the lens module is a single lens or a lens set composed of multiple lenses; when the lens module is the single lens, the optical transmitter unit array module is arranged on a focal plane of the lens, and the optical signal transmitted by each optical transmitter unit is refracted to some direction through the lens, thereby having an energy centralization feature depending on the transmitting angle, so as to form one beam; when the lens module is the lens set composed of multiple lenses, each lens covers one or multiple optical transmitter units, the optical transmitter unit corresponding to each lens is arranged on the focal plane of the lens, the optical signal transmitted by each optical transmitter unit forms one beam through the lens, or the optical signals transmitted by the multiple optical transmitter units corresponding to one lens form one beam through the lens.

Further, at the base station side, the transmitting device generates multi-beam coverage or large-scale beam coverage in the communication scope thereof by using the optical transmitter unit array module and the lens module, the beams generated by different optical transmitter units cover different regions, the optical wireless communication is conducted in the beam domain, which comprises beam domain optical downlink transmission; the beam domain optical downlink transmission process comprises that the base station or transmitting device generates the transmitting signal by using the channel state information of each user terminal or receiving device, different optical transmitter units in the same optical transmitter unit array module transmit different signals, and one optical transmitter unit array module transmits the signals to different user terminals or receiving devices simultaneously.

Further, when the downlink transmitting signal generation module generates the transmitting signal according to the channel state information of each user terminal or receiving device, a linear precoding beam domain transmission based on maximum ratio transmission or regularized zero forcing, or a beam division multiple access downlink transmission is used.

Further, the beam division multiple access downlink transmission comprises that the base station or transmitting device conducts user scheduling and beam allocation according to the channel state information of each user terminal or receiving device, selects multiple user terminals or receiving devices capable of communicating by using the same time-frequency resource, and allocate non-overlapping beam sets to the user terminals or receiving devices that are communicated simultaneously, and the base station or transmitting device transmits pilot signals and data signals to the user terminal or receiving device on the beam allocated to each user terminal or receiving device.

Further, the optical receiving module is a single optical receiver unit, or is composed of the optical receiver unit array and the lens; when the optical receiving module is the single optical receiver unit, the optical receiving module receives the transmitting signal from one base station or transmitting device; and when the optical receiving module is composed of the optical receiver unit array and the lens, the optical receiving module receives the transmitting signals from single or multiple base station or transmitting devices at different positions, and the lens refracts optical signals in different directions to different optical receiver units.

Further, the channel estimation module estimates the channel state information according to the received pilot signal, the channel state information is the path gain of all the beams transmitted from the base station or transmitting device to the user terminal or receiving device; when a linear precoding beam domain transmission based on maximum ratio transmission or regularized zero forcing is used, the channel state information is the equivalent channel gain of each data stream in the precoding domain; and when a beam division multiple access downlink transmission is used, the channel state information comprises the channel gain from the beam or beam set allocated for each user terminal or receiving device at the base station or transmitting device to the user terminal or receiving device.

Further, the receiving processing conducted by the signal detection module to the received data signal comprises signal detection and decoding, and recovery of original transmitting signals.

A beam domain optical wireless bidirectional communication method, wherein a base station of beam domain optical wireless communication is equipped with an optical transceiver port array and a lens, each optical transceiver port has the function of transmitting and receiving optical signals, each optical transceiver port form a transmitting and receiving beam through the lens, different optical transceiver ports form the transmitting and receiving beams in different directions through the lens, the base station forms multi-beam coverage or large-scale beam coverage in the communication scope thereof by using the optical transceiver port array and the lens, different beams cover different regions, and the base station simultaneously communicates with different user terminals in the beam domain.

Further, the optical transceiver port is an optical fiber port, different optical transceiver ports are separated from each other by using a photoresist or reflective material to form the optical transceiver port array, and a square array or a circular array is used as the optical transceiver port array.

Further, the base station is equipped with single or multiple lenses; when the single lens is arranged, the lens covers all the optical transceiver ports, the optical transceiver port array is arranged on the focal plane of the lens, the optical signal transmitted by each optical transceiver port is refracted to some direction through the lens, thereby having an energy centralization feature depending on the transmitting angle, so as to form one beam, and the optical signal transmitted by the user terminal in some beam region is refracted to corresponding optical transceiver port through the lens; when the multiple lenses are arranged, each lens covers one or multiple optical transceiver ports, the optical transceiver port corresponding to each lens is arranged on the focal plane of the lens, the optical signal transmitted by each optical transceiver port forms one beam through the lens, or the optical signals transmitted by the multiple optical transceiver ports corresponding to one lens form one beam through the lens, and the optical signal transmitted by the user terminal in some beam region is refracted to one corresponding optical transceiver port through the lens or the multiple optical transceiver ports corresponding to the lens.

Further, the optical wireless communication process is conducted in the beam domain, which comprises beam domain optical downlink transmission and beam domain optical uplink transmission; the beam domain optical downlink transmission comprises that the base station generates the transmitting signal by using channel state information of each user terminal, different optical transceiver ports in the same optical transceiver port array transmit different signals, and one optical transceiver port array transmits the signals to different user terminals simultaneously; and the beam domain optical uplink transmission comprises that different user terminals transmit the signals simultaneously, different optical transceiver ports in the same optical transceiver port array receive the signals in different directions, the base station detects and decodes receiving signal by using the channel state information of each user terminal, and one optical transceiver port array receives the transmitting signals of different user terminals simultaneously.

Further, in the beam domain optical downlink transmission process, the optical signal transmitted by the base station is received by the user terminal through a transmission channel, the user terminal estimates the channel state information according to the received pilot signal, and detects the data signal by using the channel state information.

Further, in the beam domain optical downlink transmission process, when the base station generates the transmitting signal by using the channel state information of each user terminal, a linear precoding beam domain transmission based on maximum ratio transmission or regularized zero forcing, or a beam division multiple access downlink transmission is used.

Further, the beam division multiple access downlink transmission comprises that the base station conducts user scheduling and beam allocation by using the channel state information of each user terminal, selects multiple user terminals capable of communicating by using the same time-frequency resource, and allocate non-overlapping beam sets to the user terminals that are communicated simultaneously, and the base station transmits pilot signals and data signals to the user terminal on the beam allocated to each user terminal.

Further, in the beam domain optical uplink transmission process, different user terminals transmit the pilot signal and the data signal simultaneously, the base station estimates the channel state information according to the received pilot signal, and detect the received data signal by using the channel station information of each user terminal.

Further, when the base station detects and decodes the receiving signal by using the channel state information of each user terminal, a linear receiver beam domain transmission based on maximum ratio combining or minimum mean square error, or a beam domain transmission based on MMSE successive interference cancellation, or a beam division multiple access uplink transmission is used.

Further, the beam division multiple access uplink transmission comprises that the base station conducts user scheduling and beam allocation by using the channel state information of each user terminal, selects multiple user terminals capable of communicating by using the same time-frequency resource, and allocates non-overlapping beam sets to the user terminals that are communicated simultaneously, and the base station receives the transmitting signal of the user terminal on the beam set allocated to each user terminal.

Further, the user terminal is equipped with an optical transceiver device, the optical transceiver device is the single optical transceiver port, or is composed of the optical transceiver port array and the lens; when the optical transceiver device is the single optical transceiver port, the optical transceiver device only receives and transmits a data stream; and when the optical transceiver device is composed of the optical transceiver port array and the lens, the optical transceiver device receives the transmitting signals of single or multiple base stations at different positions, the lens refracts optical signals in different directions to different optical transceiver ports for, or the optical transceiver device transmits the signals to single or multiple base stations at different positions, and the lens refracts optical signals transmitted by different optical transceiver ports to different directions.

A beam domain optical wireless bidirectional communication system comprises a base station side device and a user terminal side device;

the base station side device comprising:
an optical transceiver port array module, configured to transmit optical signals of different beams in downlink transmission and receive the optical signals of different beams in uplink transmission, wherein each optical transceiver port independently transmits and receives the optical signal;
a lens module, configured to refract the optical signals transmitted by different optical transceiver ports to different directions to form different beams, and refract the optical signals transmitted by the user terminals in different regions to different optical transceiver ports;
a downlink transmitting signal generation module, configured to generate the signals transmitted to different user terminals;
an uplink channel estimation module, configured to estimate channel state information of each user terminal according to the pilot signal transmitted by the user terminal; and
an uplink signal detection module, configured to detect data signals transmitted by different user terminals using the channel state information of each user terminal, and recover the transmitting signal of each user terminal; and the user terminal side device comprising:
an optical transceiver module, configured to receive the downlink optical signal transmitted by the base station and transmit the optical signal of the user terminal in uplink transmission;
a downlink channel estimation module, configured to estimate the channel state information according to the received pilot signal;
a downlink signal detection module, configured to detect the data signal by using the channel state information; and
an uplink transmitting signal generation module, configured to generate the uplink transmitting signal of the user terminal.

Further, the optical transceiver port is an optical fiber port, with two functions of receiving and transmitting optical signals, different optical transceiver ports are separated from each other by using a photoresist or reflective material to form the optical transceiver port array, and a square array or a circular array is used as the optical transceiver port array.

Further, the lens module is a single lens or a lens set composed of multiple lenses; when the lens module is the single lens, the lens covers all the optical transceiver ports, the optical transceiver port array is arranged on the focal plane of the lens, the optical signal transmitted by each optical transceiver port is refracted to some direction through the lens, thereby having an energy centralization feature depending on the transmitting angle, so as to form one beam, and the optical signal transmitted by the user terminal in some beam domain is refracted to corresponding optical transceiver port through the lens; when the lens module is the lens set composed of the multiple lenses, each lens covers one or multiple optical transceiver ports, the optical transceiver port corresponding to each lens is arranged on the focal plane of the lens, the optical signal transmitted by each optical transceiver port forms one beam through the lens, or the optical signals transmitted by the multiple optical transceiver ports corresponding to one lens form one beam through the lens, and the optical signal transmitted by the user terminal in some beam region is refracted to one or multiple corresponding optical transceiver ports through the lens.

Further, the base station generates multi-beam coverage or large-scale beam coverage in the communication scope thereof by using the optical transceiver port array module and the lens module, the beams generated by different optical transceiver ports cover different regions, the optical signals transmitted by the user terminals in different regions are refracted to different optical transceiver ports through the lens module, and different optical transceiver ports receives the signals in different directions; the optical wireless bidirectional communication is conducted in the beam domain, which comprises beam domain optical downlink transmission and beam domain optical uplink transmission; the beam domain optical downlink transmission comprises that the base station generates the transmitted signal by using the channel state information of each user terminal, different optical transceiver ports in the same optical transceiver port array module transmit different signals, and one optical transceiver port array module transmits the signals to different user terminal simultaneously; and the beam domain optical uplink transmission comprises that different user terminals transmit the signals simultaneously, different optical transceiver ports in the same optical transceiver port array module receive the signals in different directions, the base station detects and decodes the receiving signal by using the channel state information of each user terminal, and one optical transceiver port array module receives the transmitting signals of different user terminals simultaneously.

Further, when the downlink transmitting signal generation module generates the transmitting signal according to the channel state information of each user terminal, a linear precoding beam domain transmission based on maximum ratio transmission or regularized zero forcing, or a beam division multiple access downlink transmission is used.

Further, the beam division multiple access downlink transmission comprises that the base station conducts user scheduling and beam allocation by using the channel state information of each user terminal, selects multiple user terminals capable of communicating by using the same time-frequency resource, and allocates non-overlapping beam sets to the user terminals that are communicated simultaneously, and the base station transmits the signal to the user terminal on the beam allocated to each user terminal.

Further, when the uplink signal detection module detects and decodes the receiving signal by using the channel state information of each user terminal, a linear receiver beam domain transmission based on maximum ratio combining or minimum mean square error, or a beam domain transmission based on MMSE successive interference cancellation, or a beam division multiple access uplink transmission is used.

Further, the beam division multiple access uplink transmission comprises that the base station conducts user scheduling and beam allocation by using the channel state information of each user terminal, selects multiple user terminals capable of communicating by using the same time-frequency resource, and allocates non-overlapping beam sets to the user terminals that are communicated simultaneously, and the base station receives the transmitting signal of the user terminal on the beam set allocated to each user terminal.

Further, the optical transceiver module is the single optical transceiver port, or is composed of the optical transceiver port array and the lens; when the optical transceiver module is the single optical transceiver port, the optical transceiver module only receives and transmits a data stream; and when the optical transceiver module is composed of the optical transceiver port array and the lens, the optical transceiver module receives the transmitting signals of single or multiple base stations at different positions, the lens refracts optical signals in different directions to different optical transceiver ports, or the optical transceiver module transmits the signals to single or multiple base stations at different positions, and the lens refracts optical signals transmitted by different optical transceiver ports to different directions.

Further, the uplink transmitting signal generation module generates the uplink transmitting signal of the user terminal, when the optical transceiver module is the single optical transceiver port, the uplink transmitting signal generation module generates a set of pilot signals and data signals; when the optical transceiver module is composed of the optical transceiver port array and the lens, the uplink transmitting signal generation module generates single or multiple sets of pilot signals and data signals according to the quantity of the base stations, and different signals are transmitting from the optical transceiver ports corresponding to each base station.

Further, the downlink channel estimation module estimates the channel state information according to the received pilot signal, and the channel state information comprises the path gain from all the beams transmitted by the base station to the user terminal; when a linear precoding beam domain transmission based on maximum ratio transmission or regularized zero forcing is used, the channel state information comprises the equivalent channel gain of each data stream in the precoding domain; and when a beam division multiple access downlink transmission is used, the channel state information comprises the channel gain from the beam or beam set allocated for each user terminal by the base station to the user terminal.

Further, the receiving processing according to the channel state information comprises signal detection and decoding, and recovery of original transmitting signals.

The beneficiary effects brought by using the technical solutions above are as follows.

(1) In the present invention, the base station generates multi-beam coverage in the communication region by using the lens, and different beams cover different regions, thereby greatly improving spatial resolution, and significantly increasing the number of parallel transmission user terminals and the system transmission rate;

(2) in the present invention, the optical signals transmitted by different optical transmitting unit or optical transceiver ports are refracted to different directions through the lens, and the optical signals transmitted by user terminals at different positions are refracted to different optical transceiver ports through the lens, thereby reducing interference between users and improving the system spectrum efficiency and power efficiency;

(3) in the present invention, the base station of beam domain optical wireless communication only needs to be equipped with the optical transmitting unit array, or the optical transceiver port array and the lens, which has a simple physical implementation structure and is convenient to implement;

(4) in the present invention, the base station communicates with each user terminal by using different beams in the beam domain to improve the security of the wireless communication; and (5) in the present invention, by configuring the optical transceiver port array with simultaneous receiving and transmitting function and the lens, and according to the reciprocity of the receiving and transmitting beams, efficient bidirectional communication is realized while supporting simultaneous communication of a large number of users.

BRIEF DESCRIPTION OF THE DRAWINGS

In order to more clearly illustrate the technical solution in the embodiments of the present invention, the drawings to be used in the embodiments or the description of the prior art will be briefly introduced below. Obviously, the drawings in the following description merely indicate some embodiments of the present invention, and those skilled in the art can further obtain the drawings of other embodiments according to the drawings without giving any creative work.

DETAILED DESCRIPTION

The technical solutions of the present invention are further described hereinafter with reference to the drawings.

In order to make those skilled in the art better understand the solutions of the present invention, the technical solutions in the embodiments of the present invention will be clearly and completely described hereinafter with reference to the drawings in the embodiments of the present invention. Apparently, some embodiments of the present invention are described instead of all the embodiments. Based on the embodiments in the present invention, other embodiments obtained by those skilled in the art without going through any creative works shall all fall within the scope of protection of the present invention.

Figure 1:
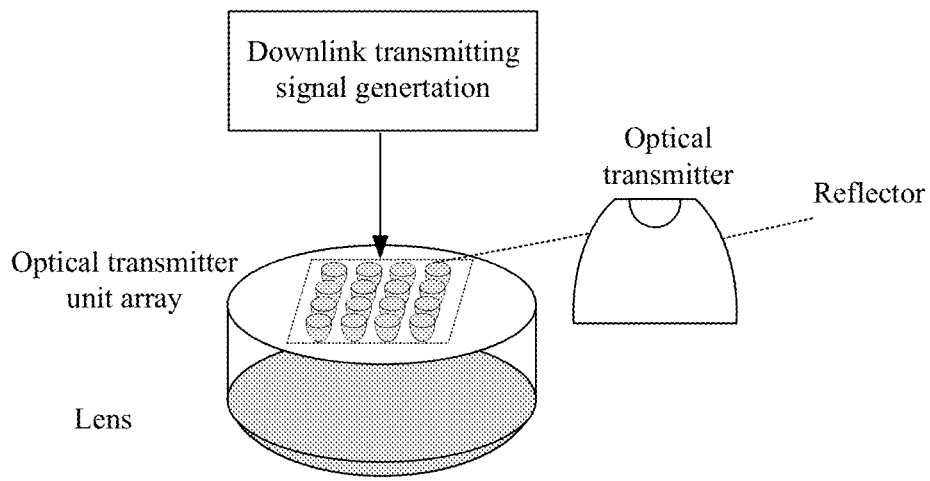
FIG. 1 is a structure diagram of a beam domain optical wireless communication base station transmitting system.

The present invention firstly discloses a beam domain optical wireless communication method and system. Consider downlink transmission of a base station or a transmitting device with multiple or a large number of user terminals or receiving devices, where the base station or the transmitting device is equipped with N optical transmitter units and one lens, and the number of simultaneously communicated user terminals or receiving devices is K, each with one optical receiver unit. FIG. 1 is a diagram of a beam domain optical wireless communication transmitting system, and the base station or the transmitting device is composed of an optical transmitter unit array, a lens and a downlink transmitting signal generation module.

The optical transmitter unit is a light emitting diode (LED), a laser diode (LD), or other light emitting devices, different optical transmitter units are separated from each other by using a photoresist or reflective material to form an optical transmitter unit array, and one of various arrays, such as a square array or a circular array is used as the optical transmitter unit array. The lens is a single lens corresponding to all optical transmitter units, or is a lens set composed of multiple lenses, and each lens is corresponding to one or multiple optical transmitter units.

When the lens adopts the single lens covering all the optical transmitter units, the optical transmitter unit array is located on the focal plane of the lens, an optical signal transmitted by each optical transmitter unit is refracted to some direction through the lens, thereby having an energy centralization feature depending on the transmitting angle, so as to form one beam, the optical signals transmitted by different optical transmitter units are refracted to different directions through the lens, and different beams cover different regions. When the lens adopts the lens set composed of multiple lenses, one lens covers one or multiple optical transmitter units, the optical transmitter unit corresponding to each lens is arranged on the focal plane of the lens, the optical signal transmitted by each optical transmitter unit forms one beam through the lens, or the optical signals transmitted by the multiple optical transmitter units corresponding to one lens form one beam through the lens, and different beams cover different regions.

Figure 2:
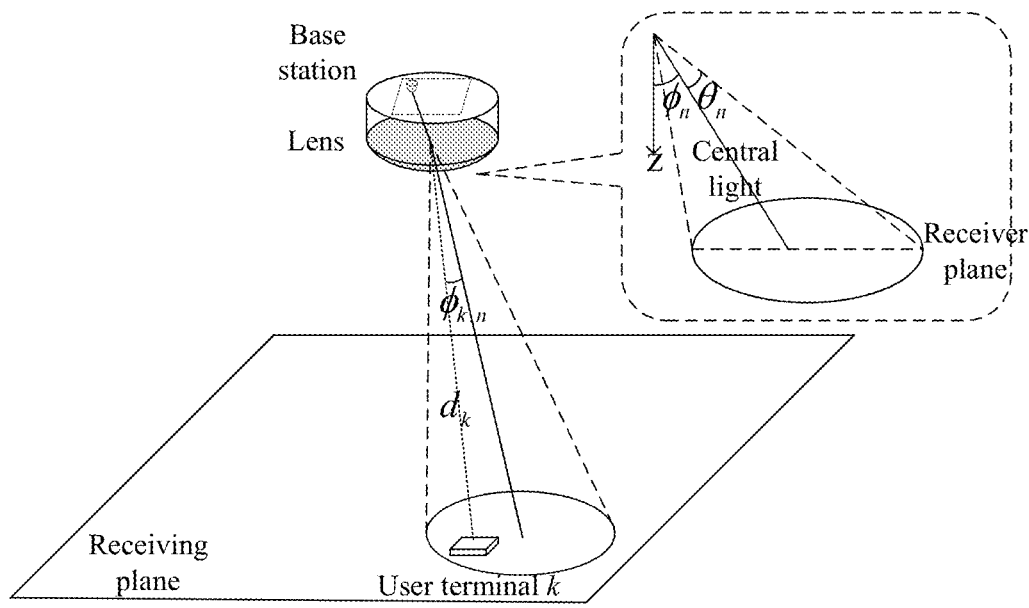
FIG. 2 is a schematic diagram illustrating the generation of a single beam.

In this embodiment, taking the beam generation by single lens as an example, a lens set composed of multiple lenses can be used to similarly generate the beam. An optical signal transmitted by the single optical transmitter unit is refracted to some direction through the lens to form one beam, as shown in FIG. 2. Taking an $n^{th}$ optical transmitter unit as an example, the ray of strongest light intensity in the center of the beam is called a central ray, an angle between the central ray and a z-axis is $\phi_n$, and $\theta_n$ is a half angle of the beam (the light intensity in the direction is a half of the light intensity in the center); after the beam is refracted by the lens, the optical beam intensity on the receiving plane can be represented by Lambertian distribution:

$$I_n(\phi) = \frac{m_n+1}{2\pi}\cos^{m_n}(\phi)\cos(\phi_n) \quad (1)$$

where, $\phi$ is an angle between an illumination direction and the central ray, and $m_n$ is a Lambertian index:

$$m_n = \frac{-\log 2}{\log(\cos(\theta_n))} \quad (2)$$

It is assumed that user terminal k is in the beam region formed by the $n^{th}$ optical transmitter unit, the distance between user terminal k and the base station is $d_k$, the angle between the user terminal and the central ray is $\phi_{k,n}$, then the channel gain of the $n^{th}$ beam to the $k^{th}$ user terminal is $h_{k,n}$:

$$h_{k,n} = \begin{cases} \frac{A_R}{d_k^2}I_n(\phi_{k,n})T(\phi_{k,n})\cos(\varphi_k), & \varphi_k \leq \varphi_C \\ 0, & \varphi_k > \varphi_C \end{cases} \quad (3)$$

where, $A_R$ is a receiving area of the user terminal, $T(\phi_{k,n})$ indicates the loss of the lens on the refracted ray, $\varphi_k$ is a receiving angle of a user, $\varphi_c$ indicates a view width of the user terminal, and the user cannot receive rays exceeding the view width. The channel vector of the base station or the transmitting device to the $k^{th}$ user terminal or receiving device is $h_k^T \in \square^{1 \times N}$:

$$h_k^T = [h_{k,1}\ h_{k,2}\ \ldots\ h_{k,N}] \quad (4)$$

Figure 3A:
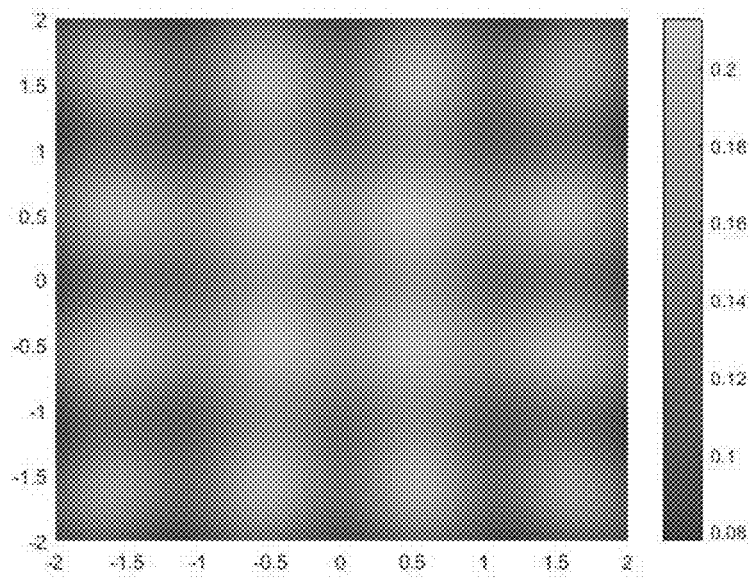
FIGS. 3(a) and 3(b) are schematic diagrams illustrating the gains of beams on a receiving plane, the base station of 3(a) is equipped with 16 optical transmitter units, and the base station of 3(b) is equipped with 64 optical transmitter units.
Figure 3B:
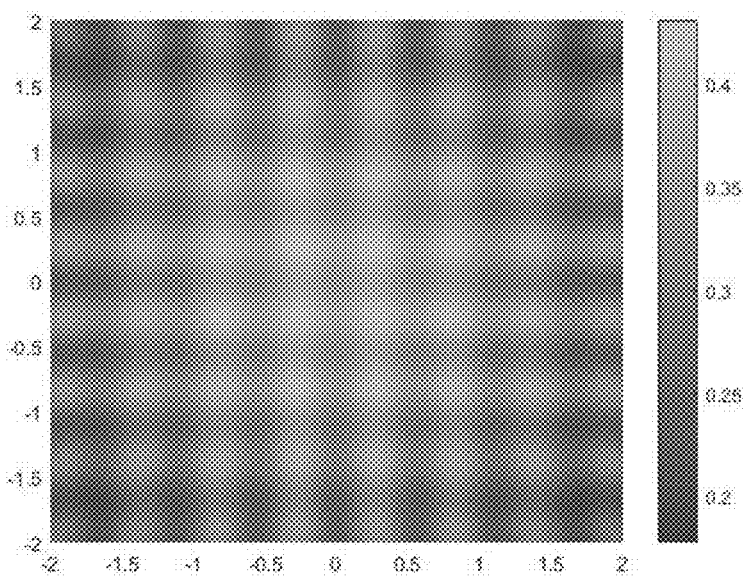

The base station or the transmitting device generates multi-beam coverage or large-scale beam coverage in the communication scope thereof by using the optical transmitter unit array and the lens, and the beam channel gains on the receiving plane are as shown in FIGS. 3(*a*) and 3(*b*). FIG. 3(*a*) shows the distribution of the beam gains when the base station is equipped with 16 optical transmitter units; and FIG. 3(*b*) shows the distribution of the beam gains when the base station is equipped with 64 optical transmitter units. The optical signals transmitted by different optical transmitter units are refracted to different directions through the lens, and different beams cover different regions. Comparing FIG. 3(*a*) with FIG. 3(*b*), with the increasing number of the optical transmitter units at the base station or the transmitting device, the gains of each beam are more concentrated, the beam coverage scope is smaller, and the base station can distinguish more spatial positions.

Figure 4:
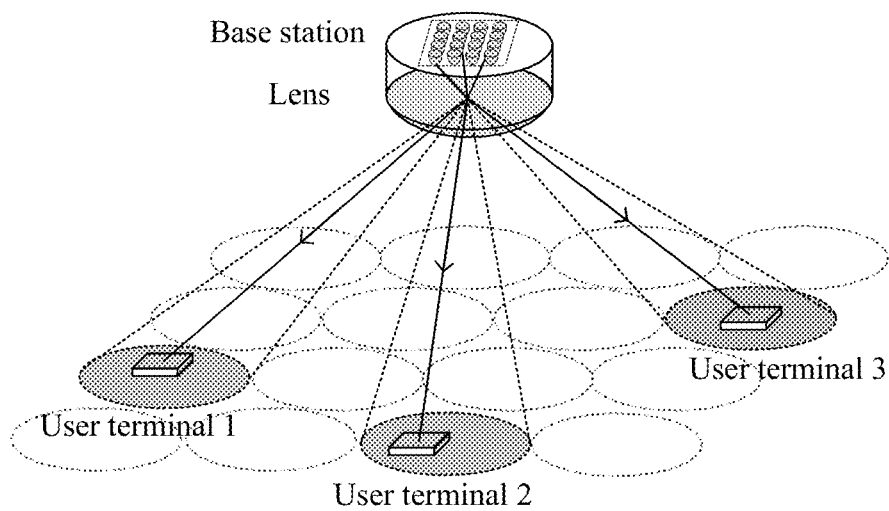
FIG. 4 is a schematic diagram of beam domain optical wireless communication.

FIG. 4 is a schematic diagram of beam domain optical wireless communication, the base station or the transmitting device generates multi-beam or large-scale beam in the communication scope thereof, different beams cover different regions, in order to ensure full coverage of the communication regions and reduce interference between beams, the overlapped position of two adjacent beams is the position where the intensity of the respective central ray of the beam is attenuated by a half. The communication process is implemented in the beam domain, comprising beam domain optical downlink transmission. In the beam domain optical downlink transmission, different optical transmitter units in the same optical transmitter unit array transmit different signals, and the base station or the transmitting device simultaneously transmits signals to multiple or a large number of user terminals or receiving devices in the beam domain. In order to transmit multiple user signals, a downlink transmitting signal generation module of the base station or the transmitting device generates signals transmitted to each user terminal or receiving device.

In the beam domain optical downlink transmission, it is assumed that the signal transmitted by the base station or the transmitting device to the $k^{th}$ user terminal or receiving device is $x_k \in \square^{N \times 1}$, the base station or the transmitting device transmits the sum of the signals of all the user terminals or receiving devices, i.e., the transmitting signal is $x = \Sigma_k x_k$, then the receiving signal of the $k^{th}$ user terminal or receiving device can be represented as follows:

$$y_k = h_k^T x + z_k \quad (5)$$

$$= h_k^T x_k + \sum_{k' \neq k} h_k^T x_{k'} + z_k$$

where, $\Sigma_{k' \neq k} h_k^T x_{k'}$ indicates the interference of the signal transmitted by the base station or the transmitting device to other user terminals or receiving devices to the $k^{th}$ user terminal or receiving device, and $z_k$ is the equivalent Gaussian noise, with zero mean and variance $\sigma^2$. The base station or the transmitting device generates the transmitting signal $x_k$ of each user terminal or receiving device by using the channel state information of each user terminal or receiving device, different optical transmitter units transmit different signals, two transmitting signal design solutions are considered in the embodiment, comprising a linear precoding beam domain transmission solution based on MRT/RZF (maximum ratio transmission/regularized zero forcing) and BDMA (beam division multiple access) transmission solution.

1. Linear Precoding Beam Domain Transmission Solution Based on MRT/RZF

In order to simultaneously transmit the signals of K user terminals or receiving devices, the base station or the transmitting device transmits the superposition of the signals of the K user terminals or receiving devices, and the signal $x_k$ transmitted to the $k^{th}$ user terminal or receiving device is obtained from an independent identically distribute data symbol $s_k$ through a linear precoding, i.e., $$x_k = w_k s_k \quad (6)$$

where, $s_k$ is the data symbol transmitted to the $k^{th}$ user terminal or receiving device, and $w_k$ is a linear precoding vector. Common precoding vectors comprise maximum ratio transmission (MRT) and regularized zero forcing (RZF). For MRT precoding, the precoding vector $w_k^{MRT}$ can be represented as follows:

$$w_k^{MRT} = \sqrt{\beta^{MRT}} h_k \quad (7)$$

where, $\beta^{MRT}$ is a power factor, which enables the transmitting signal $x_k$ to meet a corresponding power constraint condition; for the total power constraint condition, i.e., the total power of the transmitting signal is P, $\Sigma_k E\{x_k^T x_k\} = P$, then the power factor $\beta^{MRT}$ is as follows:

$$\beta^{MRT} = \frac{P}{\sum_k h_k^T h_k} \quad (8)$$

For RZF precoding, a precoding vector $w_k^{RZF}$ can be represented as follows:

$$w_k^{RZF} \sqrt{\beta^{RZF}} (H^T H + \alpha I)^{-1} h_k \quad (9)$$

where, $\alpha > 0$ is a regularized parameter, H is a multi-user channel matrix, $H = [h_1 \ h_2 \ \ldots \ h_K]^T$, $\beta^{RZF}$ is a power factor, which enables the transmitting signal $x_k$ to meet a corresponding power constraint condition; for the total power constraint condition, the power factor is as follows:

$$\beta^{RZF} = \frac{P}{tr(H^T H (H^T H + \alpha I)^{-2})} \quad (10)$$

The total power constraint is taken as an example here, but it is not limited to the total power constraint condition; for other power constraint conditions, a corresponding power factor $\beta$ is set.

2. BDMA Downlink Transmission Solution

It is assumed that the covariance matrix of the signal $x_k$ transmitted by the base station or the transmitting device to the $k^{th}$ user terminal or receiving device is $Q_k = E\{x_k x_k^T\}$, in view of the situation that the optical communication is implemented in the beam domain, and each optical transmitter unit transmits mutually independent data streams, i.e., the covariance matrix of the transmitting signal $Q_k$ is a diagonal matrix, and the transmission power on each optical transmitter unit is determined by the diagonal elements of $Q_k$. In the BDMA transmission, the base station or the transmitting device allocates different beam sets for different user terminals or receiving devices, the beam sets of different user terminals or receiving devices are non-overlapping with each other, and the base station transmits the signal of the user terminal or the receiving device on the beam allocated to each user terminal or receiving device. For different power constraint conditions, different power distribution matrices $Q_k$ can be obtained. In the embodiment, the total power constraint and the single optical transmitter unit power constraint are considered, and an asymptotically optimal power allocation method and a beam allocation method of equal power transmission are proposed.

(1) Asymptotically Optimal Power Allocation Method Under Total Power Constraint

The total power constraint refers to that the transmitting power of the base station or the transmitting device to all the user terminals or receiving devices does not exceed the power limitation P, i.e., $$\sum_k tr(Q_k) \leq P.$$

Regarding to the asymptotically optimal power allocation method, an asymptotic expression of sum rate is calculated with a large number of optical transmitter units, the covariance matrix of the transmitting signal is optimized to obtain the optimal design in the case of a large number of optical transmitter units, and the power allocation method comprises the following steps.

In step 1, the base station or the transmitting device selects the beam with the maximum channel gain $n_k = \arg\max h_k$ according to a channel vector $h_k$ of each user terminal or receiving device, and the maximum beam gain is denoted as $r_k = \max h_k$.

In step 2, the base station or the transmitting device selects the user terminal or the receiving device that can simultaneously communicate according to the beam $n_k$ selected by each user terminal or the receiving device. When the beams $n_k$ selected by each user terminal or receiving device are different from each other, the user terminals or the receiving devices can communicates with the base station or the transmitting device simultaneously; when the maximum beams $n_k$ selected by two or more user terminals or receiving devices are the same, the user terminal or the receiving device with the strongest channel gain is selected, and the other user terminals or receiving devices communicates with the base station or the transmitting device by using different time-frequency resources.

In step 3, the asymptotically optimal power allocation matrix $Q_k$ is a diagonal matrix, and the $(n,n)^{th}$ diagonal element is as follows:

$$[Q_k]_{nn} = \begin{cases} \left(\frac{1}{\mu} - \frac{1}{r_k}\right)^+, & n = n_k \\ 0, & n \neq n_k \end{cases} \quad (11)$$

where, $(x)^+ = \max\{x, 0\}$ operation indicates that the largest number between x and 0 is taken, $\mu$ is a Lagrangian multiplier satisfying the power constraint $$\sum_k \left(\frac{1}{\mu} - \frac{1}{r_k}\right)^+ = P$$

In step 4, the result of the formula (11) is obtained by using a water-filling algorithm, which is an asymptotically optimal power allocation result.

The transmission beam $n_k$ and the power allocation result $Q_k$ of each user terminal or receiving device can be obtained by using the algorithm above, the base station or the transmitting device transmits the signal to the $k^{th}$ user terminal or receiving device on the $n_k^{th}$ beam according to the power allocation result, and the transmitted power is $[Q_k]_{n_k n_k}$.

(2) Beam Allocation Method Under Total Power Constraint

Under the total power constraint, the embodiment provides a beam allocation method. The base station or the transmitting device selects the user terminal or the receiving device that can be simultaneously communicated according to the channel state information of each user terminal or receiving device, and allocates the non-overlapping beam sets to the user terminal or the receiving device that can be simultaneously communicated, thereby maximizing the system sum rate, and equal power distribution is used by the base station or the transmitting device on each beam. Under the condition of equal power allocation, the power allocation matrix $Q_k$ can be represented as $Q_k = \eta B_k$, where $B_k$ is a beam allocation matrix, $B_k$ is a diagonal matrix, the diagonal element can be only 1 or 0, the indices of those non-zero (unit) elements indicate that the beams transmit the signal of the $k^{th}$ user terminal or receiving device, the indices of those zero elements indicate that the beams do not transmit the signal of the $k^{th}$ user terminal or receiving device, and $\eta$ is a power factor satisfying the total power constraint condition. It is assumed that the number of beams allocated to each user terminal or receiving device does not exceed the maximum beam number limitation, the maximum beam number is represented by $B_m$. The beam allocation method under the total power constraint comprises the following steps.

In step 1, initialize the user terminal index i=1, the system sum rate R=0, and the beam allocation matrix $B_k$=0.

In step 2, initialize the beam index j=1, sort the beam gains of the user terminals or the receiving devices in the descending order according to the channel state information $h_i$ of the $i^{th}$ user terminal or receiving device, and the sorted beam gain index is recorded as $d=[d_1, d_2, \ldots, d_N]$, where $d_1$ indicates the beam index with maximum channel gain.

In step 3, set $[B]_{d_j d_j}=1$, calculate the power factor $\eta$ satisfying the total power constraint condition $\eta = P/(\Sigma_k tr(B_k))$ and the system sum rate $R_{sum}$ $$R_{sum} = \quad (12)$$

$$\frac{1}{2} \sum_k \left( \log\left(1 + \frac{\eta}{\sigma^2} h_k^T \left(\sum_{k'} B_{k'}\right) h_k\right) - \log\left(1 + \frac{\eta}{\sigma^2} h_k^T \left(\sum_{k' \neq k} B_{k'}\right) h_k\right) \right)$$

In step 4, if $R_{sum} > R$, update $R = R_{sum}$, and set j=j+1; if $j \leq B_m$, return to step 3; otherwise, set $[B_i]_{d_j d_j}=0$, and update $\eta$.

In step 5, set i=i+1, if $i \leq K$, return to step 2; otherwise, terminate the algorithm.

The beam allocation matrix $B_k$ and the power factor $\eta$ can be obtained by using the algorithm above, then the power allocation matrix $Q_k$ can be obtained through calculating $Q_k = \eta B_k$. The base station or the transmitting device transmits the signal to the $k^{th}$ user terminal or receiving device on the beam corresponding to the indices of non-zero elements of the beam distribution matrix $B_k$, and the transmitting power is $\eta$.

(3) Asymptotically Optimal Power Allocation Method Under Single Optical Transmitter Unit Power Constraint The single optical transmitter unit power constraint refers to that the transmission power of each optical transmitter unit does not exceed the power limitation p, i.e., $$\sum_k [Q_k]_{nn} \leq p.$$

The transmitting signal covariance matrix $Q_k$ is optimized under the single optical transmitter unit power constraint to maximize the asymptotic sum rate, and the power allocation method comprises the following steps.

In step 1, the base station or the transmitting device selects the beam with the maximum channel gain $n_k = \arg\max h_k$ according to a channel vector $h_k$ of each user terminal or receiving device, and the maximum beam gain is recorded as $r_k = \max h_k$.

In step 2, the base station or the transmitting device selects the user terminal or the receiving device that can simultaneously communicate according to the beam $n_k$ allocated to each user terminal or the receiving device, when the beams $n_k$ allocated to the user terminals or receiving devices are different, the user terminals or the receiving devices can be communicated with the base station or the transmitting device simultaneously; when the maximum beams $n_k$ allocated to two or more user terminals or receiving devices are the same, the user terminal or the receiving device with the maximum channel gain is selected, and the other user terminals or receiving devices are communicated with the base station or the transmitting device by using different time-frequency resources.

In step 3, the asymptotically optimal power allocation matrix $Q_k$ is a diagonal matrix, and the $(n,n)^{th}$ diagonal element is as follows:

$$[Q_k]_{nn} = \begin{cases} p, & n = n_k \\ 0, & n \neq n_k \end{cases} \quad (13)$$

The formula (13) is an asymptotically optimal power allocation result under single optical transmitter unit power constraint. The base station or the transmitting device transmits the signal to the $k^{th}$ user terminal or receiving device on the $n_k^{th}$ beam according to the power allocation result, and the transmitting power is p.

(4) Beam Allocation Method Under Single Optical Transmitter Unit Power Constraint Under the condition of equal power allocation for beams, the power allocation matrix $Q_k$ can be represented as $Q_k=pB_k$, where $B_k$ is a beam allocation matrix. $B_k$ is a diagonal matrix, and the diagonal element can be only 1 or 0. The indices of non-zero (unit) elements indicate that the beams transmit the signal of the $k^{th}$ user terminal or receiving device, and the indices of zero elements indicate that the beams do not transmit the signal of the $k^{th}$ user terminal or receiving device. It is assumed that the number of beams allocated to each user terminal or receiving device does not exceed the maximum beam number limitation, and the maximum beam number is represented by $B_m$. The beam allocation method under single optical transmitter unit power constraint comprises the following steps.

In step 1, initial the user terminal index i=1, the beam index j=1, the system sum rate R=0, and the beam allocation matrix $B_k$=0.

In step 2, sort the beam gains of the user in the descending order according to the channel state information $h_i$ of an $i^{th}$ user terminal or receiving device, and the sorted beam gain index is recorded as $d=[d_1, d_2, \ldots, d_N]$, where $d_1$ indicates the beam index with maximum channel gain.

In step 3, set $[B_i]_{d_j d_j}=1$, calculate the system sum rate $R_{sum}$ as $$R_{sum} = \frac{1}{2}\sum_k \left( \log\left(1 + \frac{p}{\sigma^2}h_k^T\left(\sum_{k'} B_{k'}\right)h_k\right) - \log\left(1 + \frac{p}{\sigma^2}h_k^T\left(\sum_{k'\neq k} B_{k'}\right)h_k\right) \right) \quad (14)$$

In step 4, if $R_{sum}>R$, update $R=R_{sum}$, and set i=i+1; if i≤K, return to step 3; otherwise, set $[B_i]_{d_j d_j}=0$.

In step 5, set j=j+1, if j≤$B_m$, set i=1, and return to step 2; otherwise, terminate the algorithm.

The beam allocation matrix $B_k$ can be obtained by using the algorithm above, then the power allocation matrix $Q_k$ can be obtained through calculating $Q_k=pB_k$. The base station or the transmitting device transmits the signal to the $k^{th}$ user terminal or receiving device on the beam corresponding to the indices of non-zero elements of the beam allocation matrix $B_k$, and the transmitting power is p.

The base station or the transmitting device generates the signal simultaneously transmitted to each user terminal or the receiving device by using the downlink transmitting signal generation module, comprising pilot signals and data signals. Each user terminal or receiving device estimates the channel state information according to the received pilot signal, and detect the data signal by using the channel state information.

Figure 5:
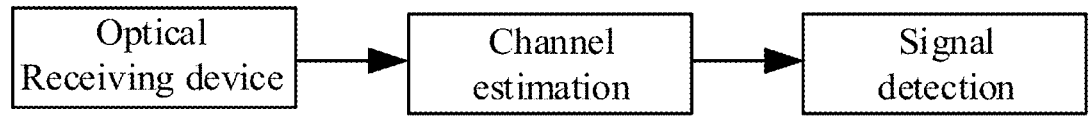
FIG. 5 is a structure diagram of a beam domain optical wireless communication receiving user terminal.

The user terminal or the receiving device is equipped with the optical receiving device, the channel estimation module and the signal detection module, as shown in FIG. 5. The optical receiving device is the single optical receiver unit or is composed of the optical receiver unit array and the lens; when the optical receiving device is the single optical receiver unit, the signal transmitted by a base station is received; and when the optical receiving device is composed of the optical receiver unit array and the lens, the signals transmitted by one or multiple base stations are received, and the optical signals in different directions are refracted to different optical receiver units through the lens.

Each user terminal or receiving device estimates the channel state information according to the received pilot signal to obtain respective channel state information. The complete channel state information is the path gain of all beams of the base station or the transmitting device to the user terminal or the receiving device, i.e., the channel vector $h_k$. When a large number of the optical transmitter units are arranged to the base station or the transmitting device, in order to decrease the overhead of pilot resources and reduce the channel state information, the channel state information of equivalent transmission is estimated according to different transmitting solutions. When the linear precoding beam domain transmission based on MRT/RZF is adopted, the equivalent channel state information is the channel gain of each data stream in the precoding domain, i.e., the inner product $h_k^T w_k$ of the channel vector and the precoding vector. When BDMA downlink transmission is adopted, the equivalent channel state information is the path gain of the beam set allocated to the user terminal or the receiving device by the base station or the transmitting device to the user terminal or the receiving device; let set $B_k$ indicate the non-zero element index set in the covariance matrix $Q_k$ transmitting the signal to the $k^{th}$ user terminal or receiving device, the equivalent channel state information is $[h_k]_{B_k}$, where $[h_k]_{B_k}$ indicates a sub-vector formed by corresponding elements in $h_k$ according to the index of the set $B_k$.

The user terminal or the receiving device detects the received data signal by using the channel state information, comprising data detection and decoding, and recovery of original transmitting signal.

Figure 6:
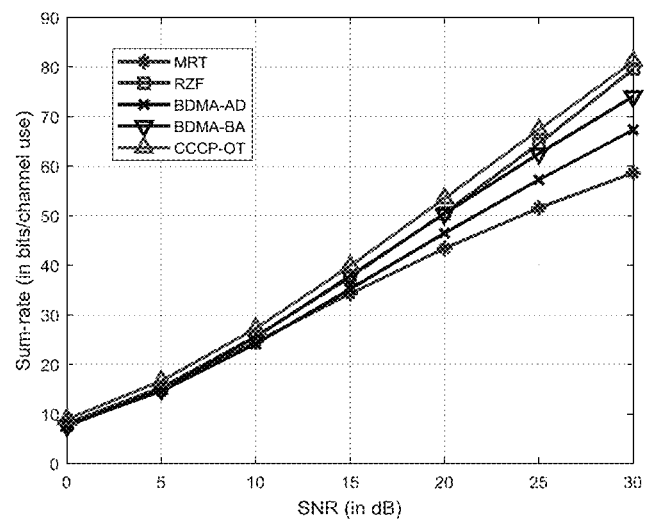
FIG. 6 is a comparison diagram of downlink transmission performances when the base station is equipped with a small-scale optical transmitter unit array.
Figure 7:
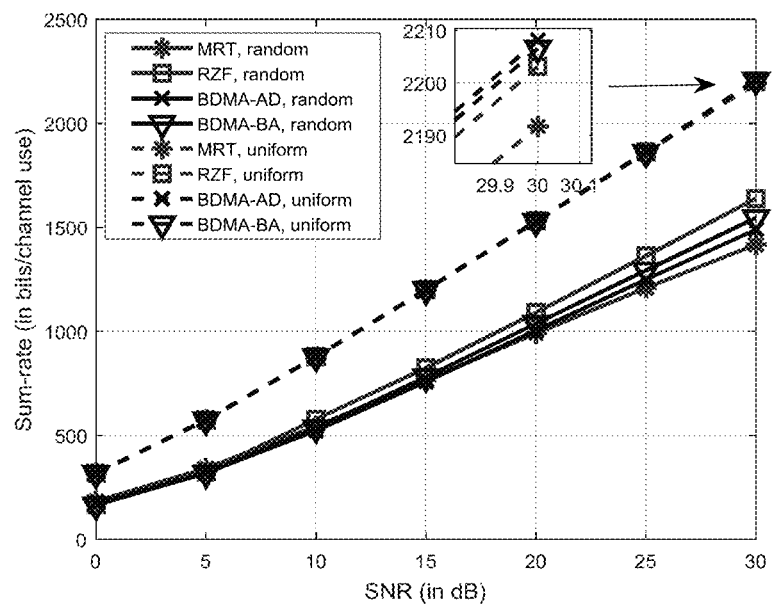
FIG. 7 is a comparison diagram of downlink transmission performances when the base station is equipped with a large-scale optical transmitter unit array.

FIGS. 6 and 7 show the beam domain transmission system sum rate when the base station or the transmitting device is equipped with a small-scale optical transmitter unit array and a large-scale optical transmitter unit array. The scenario in which the base station or the transmitting device equipped with 12×12 optical transmitter unit arrays to simultaneously serve 20 user terminals or receiving devices is illustrated in FIG. 6. The figure shows the system performances of MRT/RZF pre coding, and the system performances of BDMA asymptotically optimal design (BDMA-AD) and BDMA beam assignment (BDMA-BA), and compares the system performances with that of the optimal design using CCCP (CCCP-OT) and the base station or the transmitting device without a lens (CT-w/o lens). It can be seen that the beam domain transmission performance of the beam generated by the lens is significantly higher than that without the lens, and the BDMA transmission solution can well approximate the RZF and the optimal transmission.

The scenario in which the optical communication is applied to a wide range is shown in FIG. 7, such as a departure lounge or a gymnasium, the base station or the transmitting device equipped with 80×80 optical transmitter unit array simultaneously serves 484 user terminals or receiving devices. In view of random distribution or uniform distribution of the user terminal or the receiving device, it can be seen that the beam domain optical wireless communication can reach extremely high spectrum efficiency, when the user terminal or the receiving device is uniformly distributed, the system sum rate exceeds 2000 bits/channel use, and when the user terminal or the receiving device is randomly distributed, the system sum rate also reaches 1500 bits/channel use.

Figure 8:
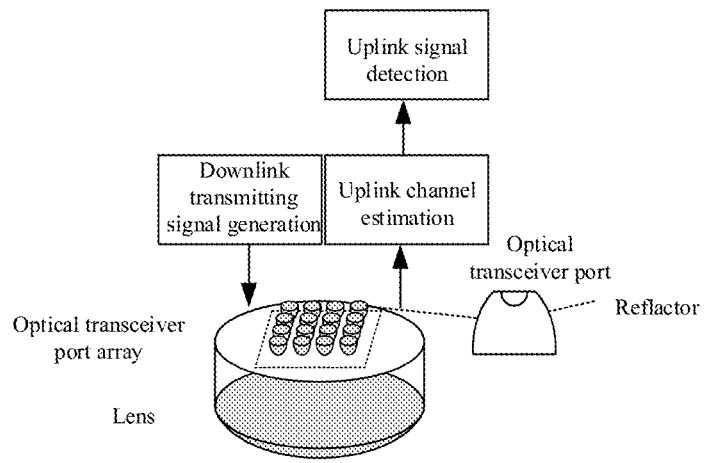
FIG. 8 is a structure diagram of a beam domain optical wireless communication base station transceiver system.

The present invention also discloses a beam domain optical wireless communication method with bidirectional communication capability. A base station side is equipped with an optical transceiver port array, a lens, a downlink transmitting signal generation module, an uplink channel estimation module, and an uplink signal detection module, as shown in FIG. 8. The optical transceiver port is a fiber port or other ports having the functions of transmitting and receiving the optical signal simultaneously, different optical transceiver ports are separated by a photoresist or reflective material to form the optical transceiver port array, and one of various arrays, such as a square array or a circular array is used in the optical transceiver port array. The lens is a single lens corresponding to all optical transceiver ports, or a lens set composed of multiple lenses, and each lens is corresponding to one or multiple optical transceiver ports.

When the lens adopts the single lens corresponding to all optical transceiver ports, the optical transceiver port array is located on the focal plane of the lens, the optical signal transmitted by each optical transceiver port is refracted to some direction through the lens to form a beam, the optical signals transmitted by different optical transceiver ports are refracted by the lens to form the beams in different regions, and the base station generates multi-beam coverage or large-scale beam coverage in the communication scope thereof by using the optical transceiver port array and the lens. The optical signals transmitted by the user terminals at different positions are refracted to different optical transceiver ports through the lens, different optical transceiver ports receive the signals from different directions, the base station divides different receiving regions in the communication scope by using the optical transceiver port and the lens, and the receiving region of the optical transceiver port corresponds to the transmitting beam region formed by the optical transceiver port.

When the lens adopts the lens set composed of multiple lenses, a lens corresponds to one or multiple optical transceiver ports, and the optical transceiver port corresponding to each lens is located on the focal plane of the lens. The optical signal transmitted by each optical transceiver port forms a beam through the lens, or the optical signals transmitted by a plurality of optical transceiver ports corresponding to a lens form a beam through the lens, different beams cover different regions, and the base station generates multi-beam coverage or large-scale beam coverage in the communication scope thereof by using the optical transceiver port array and the lens group. The optical signal transmitted by a user terminal is refracted to a corresponding optical transceiver port or a plurality of optical transceiver ports corresponding to a lens through the lens, the base station divides different receiving regions in the communication scope thereof by using the optical transceiver port and the lens group, and the receiving region of the optical transceiver port corresponds to the beam transmitting region of the optical transceiver port.

The communication process is implemented in the beam domain, comprising beam domain optical downlink transmission and beam domain optical uplink transmission. Regarding to the beam domain optical downlink transmission, the base station generates the transmitting signal by using the channel state information of each user terminal, different optical transceiver ports in the same optical transceiver port array transmit different signals, and an optical transceiver port array can simultaneously transmit signals to multiple or a large number of user terminals. The beam domain transmission based on MRT/RZF linear precoding, the beam division multiple access (BDMA) downlink transmission, or other solution is used in the base station, and the specific transmission solution is the same as the transmitting method of the beam domain optical wireless communication above.

Regarding to the beam domain optical uplink transmission, multiple or a large number of user terminals simultaneously transmit signals, comprising pilot signals and data signals, and different optical transceiver ports in the same optical transceiver port array receive signals in different directions. The base station estimates the channel state information according to the received pilot signal, and detect the received signal by using the channel state information of each user terminal, and an optical transceiver port array simultaneously receives the transmitting signals of multiple or a large number of user terminals.

During the beam domain optical uplink transmission process, the user terminal simultaneously transmits the signal, the signal transmitted by the $k^{th}$ user terminal is $x_k$, different optical transceiver ports receive the signals in different directions, and the base station receives the sum of signals transmitted by all user terminals, which can be represented as follows:

$$y = \sum_k h_k x_k + z \quad (15)$$

where, $z \in \square^{N \times 1}$ is a noise vector on each receiving beam of the base station side, each element thereof is independently distributed, the mean value is 0, and the variance is $\sigma^2$. The base station estimates the channel state information according to the received pilot signal, obtains the channel state information $h_k$ of each user terminal, and detect the received data signal by using the channel state information, comprising the beam domain transmission solution based on MRC/MMSE linear receiver, the beam domain transmission solution based on MMSE-SIC joint receiver, and the BDMA uplink transmission solution.

1. Beam Domain Transmission Solution Based on MRC/MMSE Linear Receiver

During the uplink transmission process, the base station receives the sum y of the signals transmitted by all the user terminals, and detects the received signals by using the channel state information of each user terminal. Two common linear receiving solutions are considered, i.e., maximum ratio combining (MRC) and minimum mean square error (MMSE) detections.

For the $k^{th}$ user terminal, the base station detects the received signal by using a receiving vector $w_k$, $$r_k = w_k^T y \quad (16)$$

For MRC solution, the receiving vector is $$w_k^{MRC} = h_k \quad (17)$$

For MMSE detection solution, the receiving vector is $$w_k^{MMSE} = (H^T H + \sigma^2 I)^{-1} h_k \quad (18)$$

where, $\sigma^2$ is the noise variance of uplink. The base station decodes the detection result $r_k$, restores the original transmitting signal, and obtains the data information of the $k^{th}$ user terminal.

2. Beam Domain Transmission Solution Based on MMSE-SIC Joint Receiver

The MMSE with successive interference cancellation (MMSE-SIC) is a set of MMSE receivers, and each MMSE receiver respectively estimates the data stream, which is the result of each stage of receiving vector after successive interference cancellation, wherein a specific process is as follows:

In step 1, initialize the user index i=1 and the signal $y^{(1)}=y$

In step 2, for the $i^{th}$ user terminal, the MMSE receiver is constructed:

$$w_i^{MS}=(H_i^T H_i+\sigma^2 I)^{-1}h_i \qquad (19)$$

where, $H_i=[h_i \ h_{i+1} \ \ldots \ h_K]^T$, if i>1, the result of the $i^{th}$ data stream after successive interference cancellation is constructed:

$$y^{(i)} = y - \sum_{k=1}^{i-1} h_k \hat{x}_k \qquad (20)$$

In step 3, MMSE detection is conducted to data $y^{(i)}$, $$r_i=(w_i^{MS})^T y^{(i)} \qquad (21)$$

and the detection result r is decoded to obtain the estimation $\hat{x}_k$ of the $i^{th}$ data.

In step 4, update i=i+1; if i≤K, return to step 2; otherwise, terminate the algorithm.

3. BDMA Uplink Transmission Solution

In the BDMA uplink transmission solution, the base station allocates different beam sets for different user terminals by using the channel state information of each user terminal, the beam sets of different user terminals do not overlap with each other, the base station receives and detects the transmitting signal of the user terminal on the beam allocated to each user terminal, and the specific process of beam distribution algorithm comprises following steps.

In step 1, initialize the user terminal index i=1, the beam index j=1, the system sum rate R=0, and the beam allocation matrix $B_k$=0

In step 2, sort the beam gains of the user in the descending order according to the channel state information h of an $i^{th}$ user terminal, and the sorted beam gain index is recorded as d=[$d_1, d_2, \ldots, d_N$], where $d_1$ indicates the beam index with maximum channel gain.

In step 3, set $[B_i]_{d_j d_j}=1$, and calculate the system sum rate $R_{sum}$ $$R_{sum} = \frac{1}{2}\sum_k \left( \log\left(1 + \frac{1}{\sigma^2}\sum_{k'} p_{k'} h_{k'}^T B_k h_{k'}\right) - \log\left(1 + \frac{1}{\sigma^2}\sum_{k'\neq k} p_{k'} h_{k'}^T B_k h_{k'}\right) \right) \qquad (22)$$

where $p_k$ is the transmitting power of the $k^{th}$ user terminal.

In step 4, if $R_{sum}$>R, update R=$R_{sum}$, and set i=i+1; if i≤K, return to step 3; otherwise, set $[B_i]_{d_j d_j}=0$.

In step 5, set j=j+1, if j≤$B_m$, set i=1, and return to step 2; otherwise, terminate the algorithm.

Through the beam allocation algorithm above, the uplink receiving beam matrix $B_k$ allocated to each user terminal by the base station, and the base station conducts the single-user detection to the transmitting signal of the $k^{th}$ user terminal on the beam corresponding to the indices of non-zero elements of the receiving beam matrix $B_k$.

Figure 9:
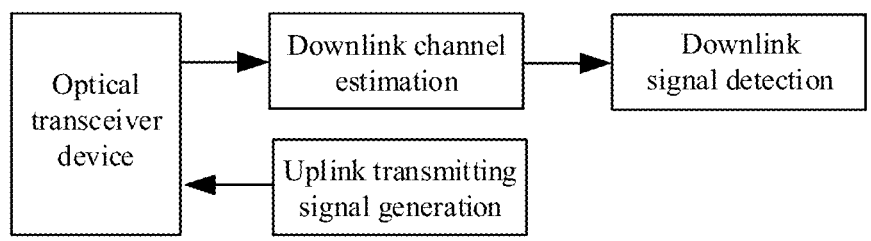
FIG. 9 is a structure diagram of a beam domain optical wireless communication transceiver user terminal.

A user terminal side device comprises an optical transceiver device module, a downlink channel estimation module, a downlink signal detection module, and an uplink transmitting signal generation module, as shown in FIG. 9.

The optical transceiver device module is a single optical transceiver port, or is composed of the optical transceiver port array and the lens; when the optical transceiver device is a single optical transceiver port, a data stream is received and transmitted; when the optical transceiver device is composed of the optical transceiver port array and the lens, the transmitting signals of the base stations at a single or multiple different positions are received, the optical signals in different directions are refracted to different optical transceiver ports through the lens, or the signals are transmitted to base stations at single or multiple different positions, and the optical signals transmitted by different optical transceiver ports are refracted in different directions through the lens. The downlink channel estimation module and the downlink signal detection module are the same as the receiving method of the beam domain optical wireless communication above. The uplink transmitting signal generation module generates an uplink transmitting signal, when single optical transceiver port is used in the optical transceiver device, a set of pilot signals and data signals are generated; and when the optical transceiver port array and the lens are used, one or multiple sets of pilot signals and data signals are generated, and different signals are transmitted on the optical transceiver ports corresponding to each base station.

In the embodiments provided by the present application, it shall be understood that the disclosed methods may be implemented in other manners without departing from the spirit and scope of the present application. The present embodiments are merely exemplary samples, and shall not be taken as limitations, and the specific contents given out shall not limit the objects of the application. For example, multiple cells or components may be combined or integrated into another system, or some characteristics may be omitted or not executed.

The description above is only detailed embodiments of the present invention, but the protection scope of the present invention is not limited by the embodiments. Those skilled in the art may easily think up of making change or replacement in the technical scope disclosed by the present invention, which shall fall in the protection scope of the present invention. Therefore, the protection scope of the present invention shall be subject to the protection scope limited by the claims.

What is claimed is:

1. A transmitting method of beam domain optical wireless communication, the method comprising:
    equipping a base station or a transmitting device of the beam domain optical wireless communication with an optical transmitter unit array and a lens,
    transmitting the optical signal by each optical transmitter unit in the optical transmitter unit array forming a beam in some direction through the lens,
    transmitting the optical signals by different optical transmitter units forming beams in different directions through the lens,
    forming beam coverage by the base station or the transmitting device in a communication scope thereof by using the optical transmitter unit array and the lens,
    covering different regions by different beams, and
    communicating the base station or the transmitting device simultaneously with each user terminal or receiving device in the beam domain,
    wherein the optical transmitter unit is a light-emitting diode or a laser diode, and different optical transmitter units are separated from each other by using a photoresist or reflective material to construct the optical transmitter unit array, and a square array or a circular array is used as the optical transmitter unit array.

2. The transmitting method of beam domain optical wireless communication according to claim 1, wherein the base station or the transmitting device is equipped with single or multiple lenses; when the single lens is arranged, the optical transmitter unit array is arranged on the focal plane of the lens, the optical signal transmitted by each optical transmitter unit is refracted to some direction through the lens, thereby having an energy centralization feature depending on the transmitting angle, so as to form one beam; when the multiple lenses are arranged, each lens covers one or multiple optical transmitter units, the optical transmitter unit corresponding to each lens is arranged on the focal plane of the lens, the optical signal transmitted by each optical transmitter unit forms one beam through the lens, or the optical signals transmitted by the multiple optical transmitter units corresponding to one lens form one beam through the lens.

3. The transmitting method of beam domain optical wireless communication according to claim 1, wherein the optical wireless communication is implemented in the beam domain, which comprises beam domain optical downlink transmission; the beam domain optical downlink transmission comprises that the base station or the transmitting device generates the transmitting signal by using channel state information of each user terminal or receiving device, different optical transmitter units in the same optical transmitter unit array transmit different signals, then the optical transmitter unit array transmits the signals to different user terminals or receiving devices simultaneously.

4. The transmitting method of beam domain optical wireless communication according to claim 3, wherein in the beam domain optical downlink transmission, when the base station or the transmitting device generates the transmitting signal by using the channel state information of each user terminal or receiving device, a linear precoding beam domain transmission based on maximum ratio transmission or regularized zero forcing, or a beam division multiple access downlink transmission is used.

5. The transmitting method of beam domain optical wireless communication according to claim 4, wherein the beam division multiple access downlink transmission comprises that the base station or the transmitting device conducts user scheduling and beam allocation according to the channel state information of each user terminal or receiving device, selects multiple user terminals or receiving devices capable of communicating by using the same time-frequency resource, allocates non-overlapping beam sets to the user terminals or the receiving devices that are communicated simultaneously, and the base station or the transmitting device transmits pilot signals and data signals to the user terminal or the receiving device on the beam allocated to each user terminal or receiving device.

6. A receiving method of beam domain optical wireless communication based on the transmitting method of claim 1, wherein the user terminal or the receiving device receives the signal transmitted in the beam domain by the base station or the transmitting device through a transmission channel, and the user terminal or the receiving device estimates channel information according to a received pilot signal, and detect the data signal by using the channel state information.

7. The receiving method of beam domain optical wireless communication according to claim 6, wherein the user terminal or the receiving device is equipped with an optical receiving device, the optical receiving device is a single optical receiver unit, or is composed of the optical receiver unit array and the lens; when the optical receiving device is the single optical receiver unit, the optical receiving device receives the transmitting signal from one base station or transmitting device; and when the optical receiving device is composed of the optical receiver unit array and the lens, the optical receiving device receives the transmitting signals from single or multiple base stations or transmitting devices at different positions, and the lens refracts optical signals in different directions to different optical receiver units.

8. The receiving method of beam domain optical wireless communication according to claim 6, wherein the channel state information is the path gain of all the beams transmitted by the base station or the transmitting device to the user terminal or the receiving device; when a linear precoding beam domain transmission based on maximum ratio transmission or regularized zero forcing is used, the channel state information is the equivalent channel gain of each data stream in the precoding domain; and when a beam division multiple access downlink transmission is used, the channel state information comprises the channel gain from the beam or beam set allocated for each user terminal or receiving device at the base station or the transmitting device to the user terminal or the receiving device.

9. The receiving method of beam domain optical wireless communication according to claim 6, wherein the receiving process comprises signal detection and decoding, and recovery of original transmitting signals.

10. A beam domain optical wireless communication system, wherein comprising the transmitting device at the base station and the receiving device at the user side;
at the base station side, the transmitting device comprising:
an optical transmitter unit array, configured to transmit optical signals of different beams in downlink transmission, wherein each optical transmitter unit independently transmits the optical signal;
a lens module, wherein the lens module is a single lens or a lens set of multiple lenses, configured to refract the optical signals transmitted by different optical transmitter unit to different directions to form different beams; and
a downlink transmitting signal generator, configured to generate signals transmitted to different user terminal or receiving devices; and
at the user terminal side, the optical receiving device comprising:
an optical receiver, configured to receive a downlink optical signal transmitted by the base station or transmitting device;
a channel estimator, configured to estimate channel state information according to a received pilot signal; and
a signal detector, configured to detect the received data signal.

11. The beam domain optical wireless communication system according to claim 10, wherein the optical transmitter unit is a light-emitting diode or a laser diode, and different optical transmitter units are separated from each other by using a photoresist or reflective material to construct the optical transmitter unit array, and a square array or a circular array is used as the optical transmitter unit array.

12. The beam domain optical wireless communication system according to claim 10, wherein when the lens module is the single lens, the optical transmitter unit array is arranged on the focal plane of the lens, and the optical signal transmitted by each optical transmitter unit is refracted to some direction through the lens, thereby having an energy centralization feature depending on the transmitting angle, so as to form one beam; when the lens module is the lens set composed of multiple lenses, each lens covers one or multiple optical transmitter units, the optical transmitter unit corresponding to each lens is arranged on the focal plane of the lens, the optical signal transmitted by each optical transmitter unit forms one beam through the lens, or the optical signals transmitted by the multiple optical transmitter units corresponding to one lens form one beam through the lens.

13. The beam domain optical wireless communication system according to claim 10, wherein at the base station side, the transmitting device generates multi-beam coverage or large-scale beam coverage in the communication scope thereof by using the optical transmitter unit array and the lens module, the beams generated by different optical transmitter units cover different regions, the optical wireless communication is conducted in the beam domain, which comprises beam domain optical downlink transmission; the beam domain optical downlink transmission process comprises that the base station or transmitting device generates the transmitting signal by using the channel state information of each user terminal or receiving device, different optical transmitter units in the same optical transmitter unit array transmit different signals, and one optical transmitter unit array transmits the signals to different user terminals or receiving devices simultaneously.

14. The beam domain optical wireless communication system according to claim 10, wherein when the downlink transmitting signal generator generates the transmitting signal according to the channel state information of each user terminal or receiving device, a linear precoding beam domain transmission based on maximum ratio transmission or regularized zero forcing, or a beam division multiple access downlink transmission is used.

15. The beam domain optical wireless communication system according to claim 14, wherein the beam division multiple access downlink transmission comprises that the base station or transmitting device conducts user scheduling and beam allocation according to the channel state information of each user terminal or receiving device, selects multiple user terminals or receiving devices capable of communicating by using the same time-frequency resource, and allocates non-overlapping beam sets to the user terminals or receiving devices that are communicated simultaneously, and the base station or transmitting device transmits pilot signals and data signals to the user terminal or receiving device on the beam allocated to each user terminal or receiving device.

16. The beam domain optical wireless communication system according to claim 10, wherein the optical receiver is a single optical receiver unit, or is composed of the optical receiver unit array and the lens; when the optical receiver is the single optical receiver unit, the optical receiver receives the transmitting signal from one base station or transmitting device; and when the optical receiver is composed of the optical receiver unit array and the lens, the optical receiver receives the transmitting signals from single or multiple base stations or transmitting devices at different positions, and the lens refracts optical signals in different directions to different optical receiver units.

17. The beam domain optical wireless communication system according to claim 10, wherein the channel estimator estimates the channel state information according to the received pilot signal, the channel state information is the path gain of all the beams transmitted from the base station or transmitting device to the user terminal or receiving device; when a linear precoding beam domain transmission based on maximum ratio transmission or regularized zero forcing is used, the channel state information is the equivalent channel gain of each data stream in the precoding domain; and when a beam division multiple access downlink transmission is used, the channel state information comprises the channel gain from the beam or beam set allocated for each user terminal or receiving device at the base station or transmitting device to the user terminal or receiving device.

18. The beam domain optical wireless communication system according to claim 10, wherein the receiving processing conducted by the signal detector to the received data signal comprises signal detection and decoding, and recovery of original transmitting signals.

19. A beam domain optical wireless bidirectional communication method, the method comprising:
equipping a base station of beam domain optical wireless communication with an optical transceiver port array and a lens, each optical transceiver port can transmit and receive optical signals,
forming a transmitting and receiving beam through the lens by each optical transceiver port,
forming the transmitting and receiving beams in different directions through the lens in different optical transceiver ports,
forming multi-beam coverage or large-scale beam coverage in the communication scope in the base station by using the optical transceiver port array and the lens, different beams cover different regions, and
communicating the base station simultaneously with different user terminals in the beam domain,
wherein the optical transceiver port s an optical fiber port, different optical transceiver ports are separated from each other by using a photoresist or reflective material to form the optical transceiver port array, and a square array or a circular array is used as the optical transceiver port array.

20. The beam domain optical wireless bidirectional communication method according to claim 19, wherein the base station is equipped with single or multiple lenses; when the single lens is arranged, the lens covers all the optical transceiver ports, the optical transceiver port array is arranged on the focal plane of the lens, the optical signal transmitted by each optical transceiver port is refracted to some direction through the lens, thereby having an energy centralization feature depending on the transmitting angle, so as to form one beam, and the optical signal transmitted by the user terminal in some beam region is refracted to corresponding optical transceiver port through the lens; when the multiple lenses are arranged, each lens covers one or multiple optical transceiver ports, the optical transceiver port corresponding to each lens is arranged on the focal plane of the lens, the optical signal transmitted by each optical transceiver port forms one beam through the lens, or the optical signals transmitting by the multiple optical transceiver ports corresponding to one lens form one beam through the lens, and the optical signal transmitted by the user terminal in some beam region is refracted to one corresponding optical transceiver port through the lens or the multiple optical transceiver ports corresponding to the lens.

21. The beam domain optical wireless bidirectional communication method according to claim 19, wherein the optical wireless communication process is conducted in the beam domain, which comprises beam domain optical downlink transmission and beam domain optical uplink transmission; the beam domain optical downlink transmission comprises that the base station generates the transmitting signal by using channel state information of each user terminal, different optical transceiver ports in the same optical transceiver port array transmit different signals, and one optical transceiver port array transmits the signals to different user terminals simultaneously; and the beam domain optical uplink transmission comprises that different user terminals transmit the signals simultaneously, different optical transceiver ports in the same optical transceiver port array receive the signals in different directions, the base station detects and decodes receiving signal by using the channel state information of each user terminal, and one optical transceiver port array receives the transmitting signals of different user terminals simultaneously.

22. The beam domain optical wireless bidirectional communication method according to claim 21, wherein in the beam domain optical downlink transmission, the optical signal transmitted by the base station is received by the user terminal through a transmission channel, the user terminal estimates the channel state information according to a received pilot signal, and detects the data signal by using the channel state information.

23. The beam domain optical wireless bidirectional communication method according to claim 21, wherein in the beam domain optical downlink transmission process, when the base station generates the transmitting signal by using the channel state information of each user terminal, a linear precoding beam domain transmission based on maximum ratio transmission or regularized zero forcing, or a beam division multiple access downlink transmission is used.

24. The beam domain optical wireless bidirectional communication method according to claim 23, wherein the beam division multiple access downlink transmission comprises that the base station conducts user scheduling and beam allocation by using the channel state information of each user terminal, selects multiple user terminals capable of communicating by using the same time-frequency resource, and allocates non-overlapping beam sets to the user terminals that are communicated simultaneously, and the base station transmits pilot signals and data signals to the user terminal on the beam allocated to each user terminal.

25. The beam domain optical wireless bidirectional communication method according to claim 21, wherein in the beam domain optical uplink transmission process, different user terminals transmit a pilot signal and the data signal simultaneously, the base station conducts the channel estimation according to the received pilot signal, and detect the received data signal by using the channel station information of each user terminal.

26. The beam domain optical wireless bidirectional communication method according to claim 25, wherein when the base station detects and decodes the receiving signal by using the channel state information of each user terminal, a linear receiver beam domain transmission based on maximum ratio combining or minimum mean square error, or a beam domain transmission based on MMSE successive interference cancellation, or a beam division multiple access uplink transmission is used.

27. The beam domain optical wireless bidirectional communication method according to claim 26, wherein the beam division multiple access uplink transmission comprises that the base station conducts user scheduling and beam allocation by using the channel state information of each user terminal, selects multiple user terminals capable of communicating by using the same time-frequency resource, and allocates non-overlapping beam sets to the user terminals that are communicated simultaneously, and the base station receives the transmitting signal of the user terminal on the beam set allocated to each user terminal.

28. The beam domain optical wireless bidirectional communication method according to claim 19, wherein the user terminal is equipped with an optical transceiver device, the optical transceiver device is the single optical transceiver port, or is composed of the optical transceiver port array and the lens; when the optical transceiver device is the single optical transceiver port, the optical transceiver device only receives and transmits a data stream; and when the optical transceiver device is composed of the optical transceiver port array and the lens, the optical transceiver device receives the transmitting signals of single or multiple base stations at different positions, the lens refracts optical signals in different directions to different optical transceiver ports, or the optical transceiver device transmits the signals to single or multiple base stations at different positions, and the lens refracts optical signals transmitted by different optical transceiver ports to different directions.

29. A beam domain optical wireless bidirectional communication system, wherein comprising a base station side device and a user terminal side device;

the base station side device comprising:
an optical transceiver port array, configured to transmit optical signals of different beams in downlink transmission and receive the optical signals of different beams in uplink transmission, wherein each optical transceiver port independently transmits and receives the optical signal;
a lens module, wherein the lens module is a single lens or a lens set composed of multiple lenses, configured to refract the optical signals transmitted by different optical transceiver ports to different directions to form different beams, and refract the optical signals transmitted by the user terminals in different regions to different optical transceiver ports;
a downlink transmitting signal generator, configured to generate the signals transmitted to different user terminals;
an uplink channel estimator, configured to estimate channel state information of each user terminal according to the pilot signal transmitted by the user terminal; and
an uplink signal detector, configured to detect data signals transmitted by different user terminals using the channel state information of each user terminal, and recover the transmitting signal of each user terminal; and the user terminal side device comprising:
an optical transceiver module, configured to receive the downlink optical signal transmitted by the base station and transmit the optical signal of the user terminal in uplink transmission;
a downlink channel estimator, configured to estimate the channel state information according to a received pilot signal;
a downlink signal detector, configured to detect the data signal by using the channel state information; and
an uplink transmitting signal generator, configured to generate the uplink transmitting signal of the user terminal.

30. The beam domain optical wireless bidirectional communication system according to claim 29, wherein the optical transceiver port is an optical fiber port, with two functions of receiving and transmitting optical signals, different optical transceiver ports are separated from each other by using a photoresist or reflective material to form the optical transceiver port array, and a square array or a circular array is used as the optical transceiver port array.

31. The beam domain optical wireless bidirectional communication system according to claim 29, wherein when the lens module is the single lens, the lens covers all the optical transceiver ports, the optical transceiver port array is arranged on the focal plane of the lens, the optical signal transmitted by each optical transceiver port is refracted to some direction through the lens, thereby having an energy centralization feature depending on the transmitting angle, so as to form one beam, and the optical signal transmitted by the user terminal in some beam region is refracted to corresponding optical transceiver port through the lens; when the lens module is the lens set composed of the multiple lenses, each lens covers one or multiple optical transceiver ports, the optical transceiver port corresponding to each lens is arranged on the focal plane of the lens, the optical signal transmitted by each optical transceiver port forms one beam through the lens, or the optical signals transmitted by the multiple optical transceiver ports corresponding to one lens form one beam through the lens, and the optical signal transmitted by the user terminal in some beam region is refracted to one or multiple corresponding optical transceiver ports through the lens.

32. The beam domain optical wireless bidirectional communication system according to claim 29, wherein the base station generates multi-beam coverage or large-scale beam coverage in the communication scope thereof by using the optical transceiver port array and the lens module, the beams generated by different optical transceiver ports cover different regions, the optical signals transmitted by the user terminals in different regions are refracted to different optical transceiver ports through the lens module, and different optical transceiver ports receives the signals in different directions; the optical wireless bidirectional communication is conducted in the beam domain, which comprises beam domain optical downlink transmission and beam domain optical uplink transmission; the beam domain optical downlink transmission comprises that the base station generates the transmitted signal by using the channel state information of each user terminal, different optical transceiver ports in the same optical transceiver port array transmit different signals, and one optical transceiver port array transmits the signals to different user terminal simultaneously; and the beam domain optical uplink transmission comprises that different user terminals transmit the signals simultaneously, different optical transceiver ports in the same optical transceiver port array receive the signals in different directions, the base station detects and decodes the receiving signal by using the channel state information of each user terminal, and one optical transceiver port array receives the transmitting signals of different user terminals simultaneously.

33. The beam domain optical wireless bidirectional communication system according to claim 29, wherein when the downlink transmitting signal generator generates the transmitting signal according to the channel state information of each user terminal, a linear precoding beam domain transmission based on maximum ratio transmission or regularized zero forcing, or a beam division multiple access downlink transmission is used.

34. The beam domain optical wireless bidirectional communication system according to claim 33, wherein the beam division multiple access downlink transmission comprises that the base station conducts user scheduling and beam allocation by using the channel state information of each user terminal, selects multiple user terminals capable of communicating by using the same time-frequency resource, and allocates non-overlapping beam sets to the user terminals that are communicated simultaneously, and the base station transmits the signal to the user terminal on the beam allocated to each user terminal.

35. The beam domain optical wireless bidirectional communication system according to claim 29, wherein when the uplink signal detector detects and decodes the receiving signal by using the channel state information of each user terminal, a linear receiver beam domain transmission based on maximum ratio combining or minimum mean square error, or a beam domain transmission based on MMSE successive interference cancellation, or a beam division multiple access uplink transmission is used.

36. The beam domain optical wireless bidirectional communication system according to claim 35, wherein the beam division multiple access uplink transmission comprises that the base station conducts user scheduling and beam allocation by using the channel state information of each user terminal, selects multiple user terminals capable of communicating by using the same time-frequency resource, and allocates non-overlapping beam sets to the user terminals that are communicated simultaneously, and the base station receives the transmitting signal of the user terminal on the beam set allocated to each user terminal.

37. The beam domain optical wireless bidirectional communication system according to claim 29, wherein the optical transceiver module is the single optical transceiver port, or is composed of the optical transceiver port array and the lens; when the optical transceiver module is the single optical transceiver port, the optical transceiver module only receives and transmits a data stream; and when the optical transceiver module is composed of the optical transceiver port array and the lens, the optical transceiver module receives the transmitting signals of single or multiple base stations at different positions, the lens refracts optical signals in different directions to different optical transceiver ports, or the optical transceiver module transmits the signals to single or multiple base stations at different positions, and the lens refracts optical signals transmitted by different optical transceiver ports to different directions.

38. The beam domain optical wireless bidirectional communication system according to claim 37, wherein the uplink transmitting signal generator generates the uplink transmitting signal of the user terminal, when the optical transceiver module is the single optical transceiver port, the uplink transmitting signal generator generates a set of pilot signals and data signals; when the optical transceiver module is composed of the optical transceiver port array and the lens, the uplink transmitting signal generator generates single or multiple sets of pilot signals and data signals according to the number of the base stations, and different signals are transmitted from the optical transceiver ports corresponding to each base station.

39. The beam domain optical wireless bidirectional communication system according to claim 29, wherein the downlink channel estimator estimates the channel state information according to the received pilot signal, and the channel state information comprises the path gain from all the beams transmitted by the base station to the user terminal; when a linear precoding beam domain transmission based on maximum ratio transmission or regularized zero forcing is used, the channel state information comprises the equivalent channel gain of each data stream in the precoding domain; and when a beam division multiple access downlink transmission is used, the channel state information comprises the channel gain from the beam or beam set allocated for each user terminal by the base station to the user terminal.

40. The beam domain optical wireless bidirectional communication system according to claim 29, wherein the receiving processing according to the channel state information comprises signal detection and decoding, and recovery of original transmitting signals.

* * * * *